United States Patent [19]

Hisano

[11] Patent Number: 4,591,918
[45] Date of Patent: May 27, 1986

[54] IMAGE SENSOR SYSTEM

[75] Inventor: Atushi Hisano, Nagaokakyo, Japan

[73] Assignee: Omron Tateisi Electronics Co., Kyoto, Japan

[21] Appl. No.: 601,530

[22] Filed: Apr. 18, 1984

[30] Foreign Application Priority Data

Apr. 18, 1983 [JP] Japan .................. 58-67977

[51] Int. Cl.$^4$ ................ H04N 5/225; H04N 5/30
[52] U.S. Cl. .................... 358/225; 358/209; 358/226
[58] Field of Search ............... 358/209, 225, 226, 55, 358/83, 224, 96, 169, 217, 211; 355/20, 70

[56] References Cited

U.S. PATENT DOCUMENTS 3,928,717 12/1975 Dorland .................. 358/83
3,928,867 12/1975 Lynch ..................... 358/169
4,423,436 12/1983 Kimura .................. 358/211

FOREIGN PATENT DOCUMENTS 8101935 7/1981 PCT Int'l Appl. ........... 358/226

Primary Examiner—Gene Z. Rubinson
Assistant Examiner—Stephen Brinich
Attorney, Agent, or Firm—Cushman Darby & Cushman

[57] ABSTRACT

The image sensor system includes an image sensing means for producing an image signal by sensing a field of view. This image signal is sent to a means which reproduces an image of the field. An optical projection means forms an optical image of this image of the field reproduced by the image reproducing means, at the same size as and in registration with the field itself and illuminating the field. Thereby contrast of the image of the field is improved by an optical feedback process.

2 Claims, 1 Drawing Figure

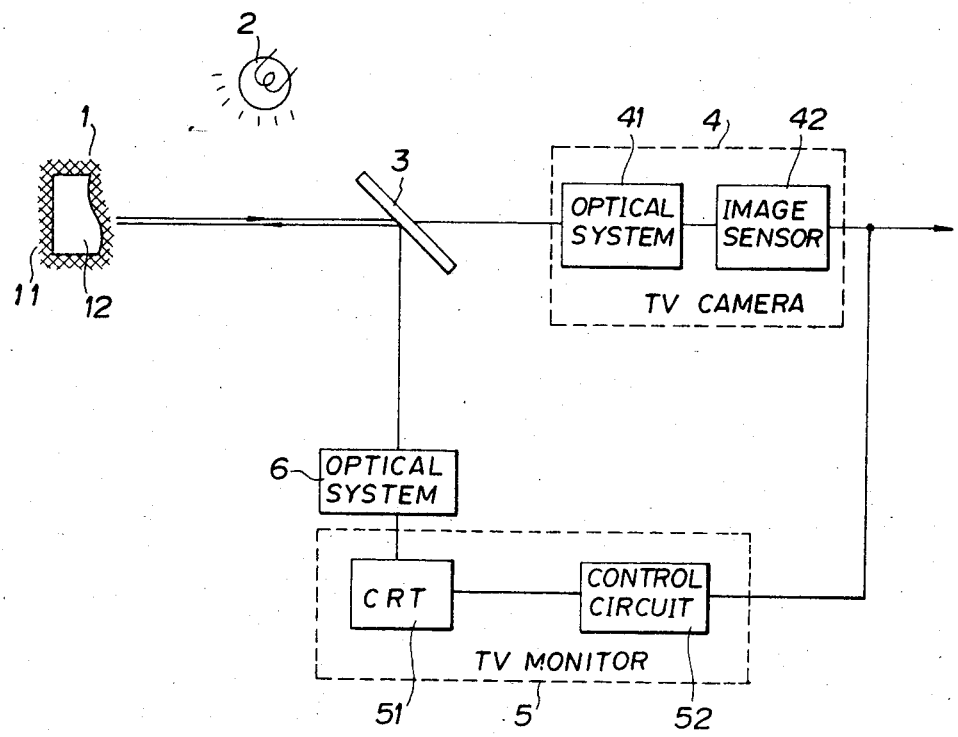

IMAGE SENSOR SYSTEM

BACKGROUND OF THE INVENTION

The present invention relates to an image sensor system which is generally called an ITV (Industrial Television) system, and in particular to such a system which can provide picture images with high contrast.

Image sensor systems such as those called ITV systems are widely used in transportation systems and commerce as well as in industry in general and are in most cases utilized for recognition of objects, identification of the configurations of objects, measurement of dimensions, monitoring of objects and inspection of defects in objects. In such applications, it is often more desirable to provide high contrast images so as to better distinguish the objects from the background rather than fine contrast images for better showing fine density gradations.

SUMMARY OF THE INVENTION

Accordingly, it is the primary object of the present invention to provide an image sensor system which can provide picture images of high contrast not by electrically processing a picture signal obtained from an image sensor but by appropriate illumination of the objects whose images are to be provided.

According to the most general aspect of the present invention, these and other objects are accomplished by an image sensor system, comprising an image sensing means for producing an image signal by sensing a field of view, a means for reproducing an image of the field by receiving the picture signal from the image sensing means, and an optical projection means for forming an optical image of the image of the field reproduced by the image reproducing means, at the same size as and in registration with the field itself, and illuminating the field.

According to such a structure, since the brighter parts of the field of view are more strongly illuminated while the darker portions are not so strongly illuminated, thereby providing a kind of feedback, the contrast of the optical image incident to the image sensor becomes extremely high, and the picture signal obtained from the image sensor becomes likewise high in contrast.

BRIEF DESCRIPTION OF THE DRAWING

The present invention will now be shown and described with reference to the preferred embodiments thereof, and with reference to the illustrative drawing, which are given for the purposes of explanation only, and are not intended to be limitative of the present invention. The sole FIGURE of the accompanying drawing is a block diagram showing the structure of an embodiment of the present invention.

DESCRIPTION OF THE PREFERRED EMBODIMENTS

The present invention will now be described with reference to the preferred embodiment thereof, and with reference to the appended drawing. The FIGURE shows this preferred embodiment in block diagram form, and the reference numeral 1 denotes a field of view which is comprised of a dark background 11 and an object 12. The object 12 is illuminated by a basic illumination source 2 and is brighter than the background 11. However, with the illumination from this basic illumination source 2 alone, the contrast of the field of view is not sufficiently high.

The field 1 is sensed by a TV camera 4 which is comprised of an optical system 41 and an image sensor 42 consisting of a Vidicon or CCD. The optical system 41 of the TV camera is focused on the object 12 in the field 1. An image signal produced from the TV camera 4 is supplied to a TV monitor 5. The TV monitor 5 consists of a control circuit 52 for image reproduction and a CRT 51 which reproduces the image thereon. In other words, the image of the field 1 as sensed by the TV camera 4 is displayed on the screen of the CRT 51 of the TV monitor 5.

A projection optical system 6 is disposed in front of the screen of the CRT 51 and the optical image produced on the CRT 51 is projected onto the field 1 by the optical system 6 by way of a half mirror 3.

By appropriately selecting the size of the screen of the CRT 51, the focal length of the optical system 6, and the positions of and mutual distances between the CRT 51, the optical system 6 and the field 1, an actual size image of the object 12 displayed on the CRT 51 is formed exactly on the actual object 12 with exact registration therebetween. This becomes possible, since the optical path from the field 1 to the TV camera 4 and the optical path on the projection side from the CRT 51 to the field 1 by way of the optical system 6 are superimposed by the half mirror 3, by adjusting the orientation and the size of the image projected on the field from the CRT 51 and the optical system 6.

As described above, the optical image of the field 1 sensed by the TV camera 4 and reproduced by the TV monitor 5 is formed on the field 1 itself at equal size and with exact registration, and illuminates this field. The illumination by this optical image makes the bright object 12 of the field 1 further even brighter, and has almost no effect on the dark background 11. As a result, the illuminated state of the field 1 increases its contrast, and the image signal produced from the TV camera 4 sensing this becomes also high in contrast.

Although the present invention has been shown and described with reference to the preferred embodiment thereof, and in terms of the illustrative drawing, it should not be considered as limited thereby. Therefore it is desired that the scope of the present invention should be defined not by any of the perhaps purely fortuitous details of the shown preferred embodiment, or of the drawing, but solely by the scope of the appended claims.

I claim:

1. An image sensor system, comprising:
   image sensing means for producing an image signal by sensing a field of view,
   means for reproducing an image of the field by receiving the picture signal from the image sensing means, and
   optical projection means for forming an optical image of the image of the field reproduced by the image reproducing means, at the same size as and in registration with the field itself and illuminating the field.

2. An image sensor system according to claim 1, wherein the optical path from the field to the image sensing means and the optical path from the optical projection means to the field are at least in part coincident.

* * * * *